(12) United States Patent
Rezeq et al.

(10) Patent No.: US 7,431,856 B2
(45) Date of Patent: Oct. 7, 2008

(54) NANO-TIP FABRICATION BY SPATIALLY CONTROLLED ETCHING

(75) Inventors: Mohamed Rezeq, Edmonton (CA); Jason Pitters, Edmonton (CA); Robert Wolkow, Edmonton (CA)

(73) Assignees: National Research Council of Canada, Ottawa, Ontario (CA); The Governors of the University of Alberta, Edmonton, AB (CA)

( * ) Notice: Subject to any disclaimer, the term of this patent is extended or adjusted under 35 U.S.C. 154(b) by 0 days.

(21) Appl. No.: 11/383,909

(22) Filed: May 17, 2006

(65) Prior Publication Data

US 2007/0025907 A1   Feb. 1, 2007

Related U.S. Application Data

(60) Provisional application No. 60/682,010, filed on May 18, 2005.

(51) Int. Cl.
   *B44C 1/22*   (2006.01)
(52) U.S. Cl. .......................... 216/58; 216/67
(58) Field of Classification Search ................. 438/706, 438/710, 712, 714, 719, 723, 724, 725; 216/58, 216/67
See application file for complete search history.

(56) References Cited

U.S. PATENT DOCUMENTS

| | | | | |
|---|---|---|---|---|
| 5,393,647 | A * | 2/1995 | Neukermans et al. | 430/320 |
| 5,611,942 | A * | 3/1997 | Mitsui et al. | 216/67 |
| 5,965,218 | A * | 10/1999 | Bothra et al. | 427/578 |
| 6,570,305 | B1 * | 5/2003 | Urayama et al. | 313/311 |
| 6,583,412 | B2 * | 6/2003 | Williams | 250/306 |
| 6,649,431 | B2 * | 11/2003 | Merkulov et al. | 438/20 |
| 6,972,155 | B2 * | 12/2005 | Gorman et al. | 428/447 |
| 7,109,551 | B2 * | 9/2006 | Sugi et al. | 257/330 |
| 2002/0112814 | A1 * | 8/2002 | Hafner et al. | 156/272.2 |
| 2003/0066962 | A1 * | 4/2003 | Kaito et al. | 250/306 |

OTHER PUBLICATIONS

Mono-atomic tips for scanning tunneling microscopy, Hans-Werner Fink, IBM J. Res, Develop, vol. 30, No. 5, Sep. 1996, pp. 460-465.

* cited by examiner

*Primary Examiner*—Kin-Chan Chen
(74) *Attorney, Agent, or Firm*—Marks & Clerk; Richard J. Mitchell

(57) ABSTRACT

A method of fabricating nano-tips involves placing a precursor nanotip with an apex and shank in a vacuum chamber; optionally applying an electric field to the precursor nanotip to remove oxide and other contaminant species; subsequently admitting an etchant gas to the vacuum chamber to perform field assisted etching by preferential adsorption of the etchant gas on the shank; and gradually reducing the applied electric field to confine the adsorption of the etchant gas to the shank as etching progresses.

24 Claims, 3 Drawing Sheets

NANO-TIP FABRICATION BY SPATIALLY CONTROLLED ETCHING

CROSS REFERENCE TO RELATED APPLICATION

This application claims the benefit under 35 USC 119(e) of prior U.S. provisional application No. 60/682,010, filed May 18, 2005, the contents of which are herein incorporated by reference.

FIELD OF THE INVENTION

This invention relates to the field of nanotechnology, and in particular to the fabrication of nanotips, that is tips having nano-scale dimensions.

BACKGROUND OF THE INVENTION

The fabrication of nano-scale tips is an important issue to permit maximum information to be obtained from any of the various scanned probe microscopes. Nanotips are required for well defined study of point contacts to metals or semiconductors as well as for the examination of molecules and small particles. Ultra-fine tips are demanded for future multiprobe experiments where limits on probe-to-probe spacing are a direct function of tip shape. In atomic force microscopy (AFM), where long-ranged interactions are manifest, resolution is determined not only by the last atom(s) of a tip, but by the micro-scale shape of the tip apex. Nanotips are also needed as electron field emitters in transmission electron microscopes and scanning electron microscopes or for field emission display applications. In the latter applications key issues are coherence, brightness and stability, all features that are improved by the use of nanotips. Nanotips made of magnetic materials may have uses in data storage applications.

In all of these cases, well defined, easily formed, clean and ultra-sharp tips would be advantageous. Several techniques have been developed to fabricate nano-tips: the deposition technique, Fink, H.-W.; IBM J. Pres. Develp. 1986, 30, 460-465; the build up technique, Binh V. T. Surf. Sci. 1988, 202, L539-L549, Tomitori, M.; Sugata, K.; Okuyama, G.; Kimata H. Surf. Sci. 1996, 355, 21-30; the pseudo-stationary profile technique, Binh V. T. Surf. Sci. 1988, 202, L539-L549; the field-surface-melting technique, Binh, V. T.; Garcia, N. Ultra-microscopy 1992, 42-44, 80-90; and the field-enhanced diffusion-growth technique, Nagaoka, K.; Fujii, H.; Matsuda, K.; Komaki, M.; Murata, Y.; Oshima, C.; Sakurai, T. Appl. Surf. Sci. 2001, 182, 12-19.

The first technique is based on depositing an evaporated W atom on a trimer of W(111) plane which was previously prepared by the controlled field evaporation of the apex, whereas the last four methods involve heat treatment and/or diffusion of some atoms on the apex. In all of the above techniques a W<111>tip was used, except in the field-surface-melting technique where a non-oriented Au tip was used as well.

The adsorption of molecular nitrogen on tungsten surfaces has been thoroughly investigated: Tamura, T.; Hamamura, T. Surf. Sci. 1980, 95, L293-L295; Yates, J. T.; Klein, Jr. R.; Madey, T. E. Surf. Sci. 1976, 58, 469-478; Serrano, M.; Darling G. R. Surf. Sci. 2003, 532-535, 206-212; Ehrlich, G.; Hudda, F. G. J. Chem. Phys. 1962, 36, 3233-3247; Ota K.; Usami, S. Surf. Sci. 1993, 278/288, 99-103; Müller E. W.; Tsong T. T.; Field ion microscopy; Principles and Applications, American Elsevier Publishing Company, Inc. New York 1969; and Rendulic K. D.; Knor Z., Surf. Sci. 1967, 7, 205-214. It has been found that several adsorption states are formed. Among these is the "strong-bond" state. This state arises from the dissociation of $N_2$ on the tungsten surface followed by diffusion into the top layer of the tungsten. This causes a protrusion of W atoms, which results in a weak surface structure and therefore a decrease in the work function. Early field ion microscopy (FIM) studies of nitrogen gas on tungsten tips found that the nitrogen reaction only occurs in low field regions, where it can penetrate the ionizing barrier. Renduic et al also showed that when a W tip was exposed to nitrogen gas, holes developed on the (111) and (001) planes, resulting from the removal of W atoms. This corrosive reaction of nitrogen was explained as follows: the protrusion of W atom from the metal surface, caused by the adsorption of $N_2$, leads to an enhanced electric field, which becomes adequate to ionize and then evaporate the protruding W atoms. This process is depicted in FIG. 1a.

In the previous FIM work, in order to allow the interaction of nitrogen gas to take place over the entire surface of the tip, a limited dose of gas was introduced after the electric field was lowered below the initial imaging value or before any field was applied on the tip.

SUMMARY OF THE INVENTION

According to the present invention there is provided a method of fabricating nano-tips comprising placing a precursor nano-tip with an apex and shank in a vacuum chamber; admitting an etchant gas to said vacuum chamber to perform field assisted etching by preferential adsorption of said etchant gas on said shank in the presence of an applied electric field; and gradually reducing the applied electric field to confine the adsorption of said etchant gas to said shank as etching progresses.

In one embodiment an electric field is applied to the precursor nanotip to remove oxide and other contaminant species before the etchant gas is admitted. The electric field used to clean the tip is different from the field used for etching. The cleaning field results in an atomically clean tip. The cleaning field starts at a high value and is lowered as cleaning proceeds. A lower field is typically used for etching. The etching field starts at a value that is normally below field evaporation threshold if etchant gas were absent. In some embodiments it may be possible to dispense with the cleaning step.

The invention provides a novel technique for fabricating nano-tips. The novel approach is based on spatially controlling the reaction of adsorbent gas, such as nitrogen, with the surface atoms of a tungsten tip, preferably in a Field Ion Microscope (FIM).

Confining this field assisted etching reaction to the shank has enables the production of single atom tips with an apex radius far sharper than the nominally 10 nm radius of curvature precursor tips. Tip sharpening is evidenced in several ways. The FIM imaging voltage drops dramatically, typically, by a factor of 2 or 3. Nano-tip formation is also evident from the increase in FIM magnification and decrease of the apex area, which are monitored throughout the experiment. Subsequent field evaporation allows the nano-tip to be sequentially deconstructed to further describe the extraordinary sharp tip that was formed.

The larger field present at the very apex of the tip due to its curvature removes adsorbing etchant molecules before chemical dissociation and further reaction with substrate atoms occurs, thereby protecting the apex from etching. The invention results from a balance of the various effects that leads to an ultra sharp tip.

The precursor can be made out of tungsten wire by chemical etching, and the adsorbent gas can be nitrogen. The invention is not however restricted to tungsten/nitrogen combinations. It is predicted that a very wide range of materials could be treated in the same or similar way to fabricate nano-tips. It is believed that almost any metal, including antiferromagnetic and ferromagnetic materials, and alloys of metals will work as the tip/substrate. Semiconductors such as silicon and doped diamond will also be subject to this nanotip formation process.

The etchant gas need not be nitrogen. The reactant can be dissociated to create reactive atomic or multi-atom fragments that in turn bind to atoms of the precursor tip. It is predicted that O2, $Cl_2$, ammonia ($NH_3$), for example, and other non-monatomic gases will work as etchants. It is believed that iodine and bromine gases, as well as H atoms, C atoms, Cl atoms, N atoms, and O atoms, among others, created in a plasma can also be used. It is also predicted that chlorine, carbon, oxygen, hydrogen and nitrogen atoms, excited state species, among others, created at the tip, or before arrival at the tip, for example in a microwave plasma, will serve as etchants. Etchant molecules may also include molecular fragments. By virtue of having a new bonding partner, the tip atoms are more readily able to break their association with the bulk of the metal substrate. The electric field assists in this process.

Nano-tips in accordance with the invention also have utility in scanning tunneling microscope (STM) and atomic force Microscope. Other applications such as experiments involving probe contacts at various materials are possible. Applications of nanotips as electron field emitters for transmission electron microscopes (TEM), scanning electron microscopes (SEM) or for field emission display technology are also possible. Nanotips made of magnetic material may also have uses in data storage applications.

In another aspect the invention provides a method of fabricating nano-tips comprising placing a precursor nanotip with an apex and shank in a vacuum chamber of a field ion microscope or like apparatus; applying an electric field to said precursor nano-tip above to remove oxide and other contaminant species; reducing the applied field to a level sufficient to obtain an image but below which evaporation of atoms from said precursor nanotip occurs; and subsequently admitting an etchant gas to said vacuum chamber to perform preferential field assisted etching on said shank. The like apparatus could be similar to an FIM in terms of its etching ability, but which is not strictly a field ion microscope, and might be made from components commonly found in an field ion microscope.

BRIEF DESCRIPTION OF THE DRAWINGS

The invention will now be described in more detail, by way of example only, with reference to the accompanying drawings, in which:—

DETAILED DESCRIPTION OF THE PREFERRED EMBODIMENTS

In accordance with the principles of the invention, nanotips are fabricated by etching tungsten tips in the presence of an adsorbent gas, such as nitrogen, which results in preferential etching of the shank relative to the apex. A constant pressure of nitrogen gas is established after a good imaging field is obtained. This prevents nitrogen from reaching the apex of the tip, due to its high field, and restricts the nitrogen reaction to the shank of the tip, which causes evaporation of W atoms from that area. Careful reduction of the applied voltage is carried out during this reaction to maintain a good imaging field of the apex. This process leads to the sharpening of the tip.

Figure 1:
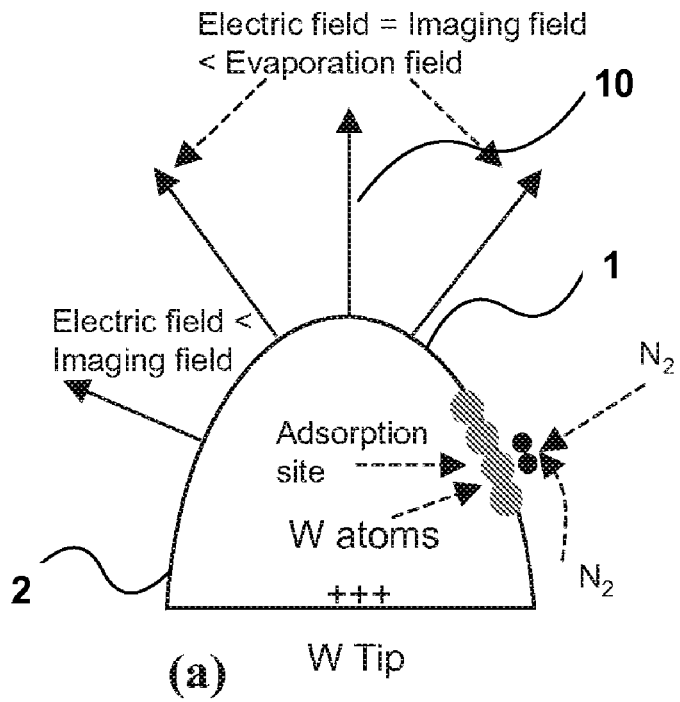
FIGS. 1a and 1b show the distribution of the electric field on the surface of a clean FIM tip and of a nitrogen reacted tip respectively at a fixed applied voltage where an adequate imaging field is attained on the apex.
Figure 1:
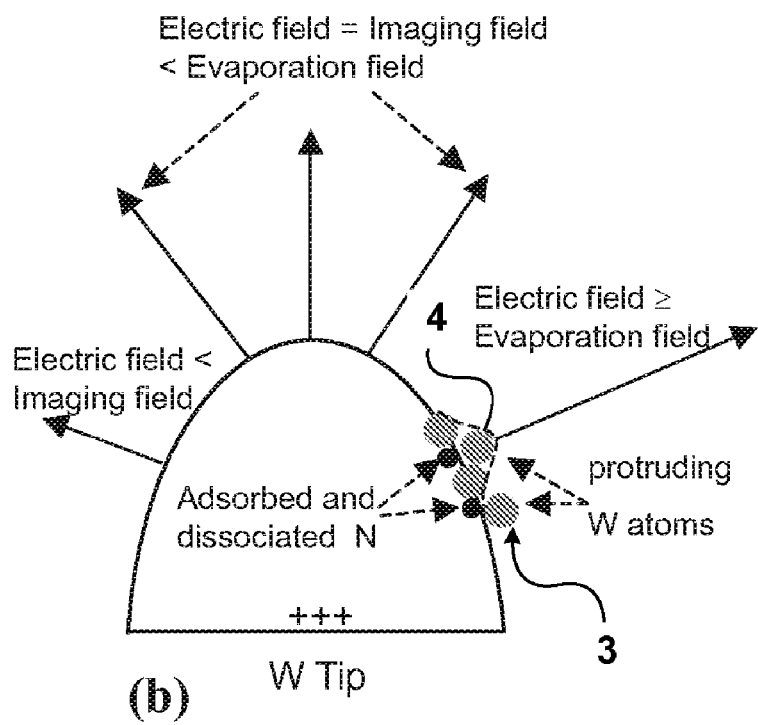

As will be seen in FIG. 1a, when the tip is placed in an electric field 10, the field strength is greatest at the apex 1 and decreases along the shank. The electric field is created by a fixed applied voltage +++.

An adsorption site 3 is formed on the shank 2 where the electric field is relatively low as shown in FIG. 1b. An atomic-scale protrusion 4 is created as a consequence of the adsorption and dissociation of nitrogen, which results in an enhanced electric field. This field is enough to evaporate a W atom at this site. The result is preferential etching of the shank 2.

FIG. 2a shows the successive tip sharpening stages during nitrogen etching in accordance with the principles of the invention, wherein the etching takes place in a field ion microscope. The etching can also take place in another instrument derived from components commonly found in a field ion microscope. The dotted line 20 refers to the original tip, dashed lines 21 refer to intermediate etched tips, and the solid line 23 refers to the final stage (nano-tip). (+) Indicates that the applied voltage at the sharp tip 1 is substantially less than the original, less sharp, tip 20.

FIG. 2b illustrates the evaporation and flattening of the tip 1. The dotted line 20 again represents the initial nano-tip; the dashed lines 24 represent intermediate field evaporated tips, and the solid line 25 represents the final broadened tip. (++++) Indicates that a higher applied voltage required for imaging than that for the initial broad tip in FIG. 2a.

EXAMPLE

In this experiment a sequence of FIM images of the apex was taken over successive time intervals. Nanotips of a few atoms and a single atom tip were reproducibly obtained.

A regular FIM tungsten tip was prepared by electrochemically etching a polycrystalline tungsten wire in NaOH solution. This was then placed in a UHV chamber with a background pressure of $2 \times 10^{-10}$ Torr. The tip, mounted on a cryostat for cooling and electrically insulated from ground, was placed 4 cm from chevron microchannel plates (MCPs) which were coupled to a phosphor screen for imaging. Two leak valves were used; one for cryo pumped helium imaging gas and the other for dosing nitrogen gas. A mass spectrometer was also mounted to monitor the pressure and the purity of nitrogen and helium gases. A DVD camera was used to capture movies, from the phosphor screen, during the experiment.

Precursor tips can be prepared in other ways, for example, but not limited to, electrochemically etched or cut wires.

Single crystal or polycrystalline wire may also be used. The vacuum is preferably an ultra high vacuum, but in some embodiments need not be.

In order to obtain FIM images of the thus formed tips, helium gas was introduced up to $8.4 \times 10^6$ Torr, the tip was cooled to $\approx 100$ K and, the MCPs and the phosphor screen were biased at their operating voltages. Subsequently, a positive voltage was gradually applied on the tip until an adequate field for removing the oxide layer and other contaminant species was attained. The field was further increased for successive field evaporation of a few layers from the apex in order to prepare a clean, defect-free and a broad-surface tip.

A good FIM image was obtained at a tip voltage of 4.4 kV. At this point a constant pressure of nitrogen gas ($4.2 \times 10^{-8}$ Torr) was introduced into the chamber. These conditions led to evaporation of W atoms, due to $N_2$ adsorption, from the shank of the tip, but crucially, not from the apex.

If the applied voltage on the tip is fixed, the removal of atoms from the periphery of the apex makes the tip sharper which consequently enhances the field on the apex to a point where the W apex atoms will begin to field evaporate. To avoid evaporation of atoms from the center of the apex, the applied voltage was reduced below the evaporation value. Since the nitrogen pressure is constant, new nitrogen atoms will reach the edges of the apex, and the same events will occur, therefore careful and continuous reduction of the applied voltage during this reaction was carried out in order to confine the adsorption of nitrogen to the shank and prevent W apex atoms from evaporation.

As this controlled reaction is continuing, more atoms evaporate from the shank or the perimeter of the apex, which leads to a decrease in the apex area and hence a sharper tip. When an apex of just a few atoms was attained a more careful field adjustment had to be performed to obtain a single atom tip, because the field changes dramatically with the evaporation of the last few atoms surrounding the apex. At this point, $N_2$ gas was shut off to stop the reaction.

For further tip analysis, the sharpness of the tip was verified by evaporating the top atomic layers of the nano-tip successively. From the width of each layer, which can be known from the number of atoms in that particular layer and the distance between layers, the size of the tip can be estimated.

Figure 2:
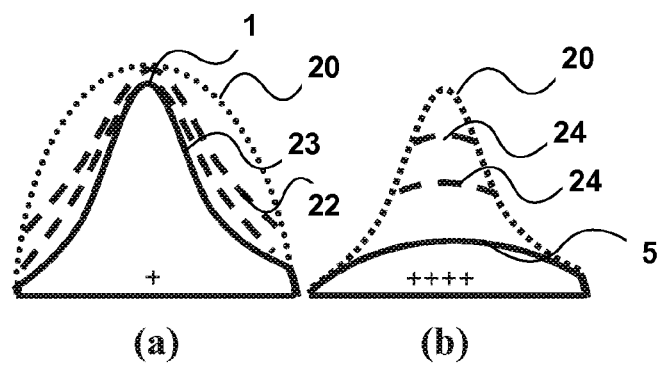
FIG. 2a illustrates the changing shape of the tips during nitrogen etching.
FIG. 2b illustrates deconstruction of the nano tip.

As noted above, the two processes (i.e. sharpening and broadening of the tip) are illustrated schematically in FIG. 2. FIG. 2a represents the etching process and describes how the apex area decreases. FIG. 2b illustrates the evaporation and flattening of the tip.

Figure 3:
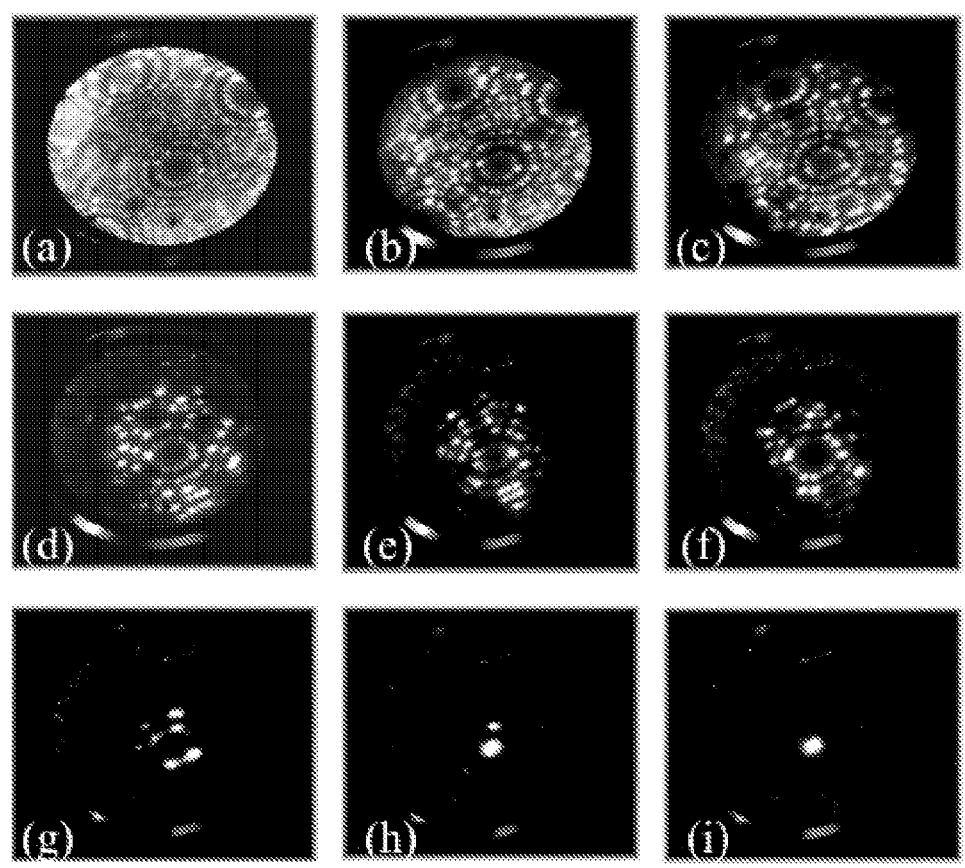
FIG. 3a to 3i show frames captured from a movie taken during the controlled nitrogen reaction with the tungsten FIM tip.

The sequence of FIM images in FIG. 3 displays frames captured from a 30 minute movie and represents successive stages of the nitrogen etching. FIG. 3a is an image of a relatively wide-apex tip ($\approx 10$ nm), which was prepared by performing field evaporation for a regular FIM tip. The imaging voltage was 4.4 kV. The successive images show a nitrogen-etched tip at different stages of this reaction and at reduced voltages. The apex area decreases throughout this process and an apex of two atomic layers was obtained as shown in FIG. 3g. Continued etching led to apex of two atoms (FIG. 3h) and eventually a single atom tip was produced (FIG. 3i). The imaging voltage of the single atom tip was 1.6 kV. The brighter area in FIG. 3a, top left of the apex, is area where the field is high, since $N_2$ adsorption caused protrusion at the perimeter of the apex. The atoms in this area are the first atoms to evaporate from the apex. If we look carefully at the FIM feature through the sequence of images we can readily find out, as we move from FIG. 3a to FIG. 3i, that the size of bright spots (i.e. atoms) is increasing. This is an important indication that the tip is getting sharper along this process, since it is well established that the magnification and resolution are higher for a sharper tip. Another indication of the sharpness of the tip is the reduced imaging voltage required for the successive images, since $F_0 \propto V/R$ where $F_0$ is the imaging field, V is the applied voltage and R is the radius of curvature of the tip. In this case the voltage reduced from 4.4 kV at the original tip to 1.6 kV at the single atom tip.

Direct comparison between any two successive frames can not be made because these frames are taken at different time periods where many events took place but were not captured. However two successive events were captured in FIG. 3h and FIG. 3i. Here we see the progression from two atom tip to a single atom tip. To stop this reaction at the moment of obtaining a single atom tip, the nitrogen source was shut off and the existent nitrogen gas was pumped out. The tip voltage was then slightly reduced to avoid field enhancement and evaporation of the last apex atom.

FIGS. 4a to 4i illustrate a sequence of frames captured during the subsequent field evaporation of the single atom tip prepared in FIG. 3. After the removal of the first layer (the single atom) the lower atomic plane appeared with a few atoms. Continuing field evaporation led to the appearance of more planes and larger number of atoms. This indicates that the tip is flattening. This tip broadening is also clear from observing the decrease of the size of spots in different successive frames. The last frame, FIG. 4i, refers to a stage where the field evaporation was stopped and a tip of a relatively large radius of curvature was obtained ($\approx 13$ nm). The ultimate evaporation voltage was 5.8 kV and then the voltage was reduced to a good imaging field at 5.4 kV. The imaging voltage of the new broad tip is higher than that of the original tip, which means a tip of a larger radius of curvature.

Figure 4:
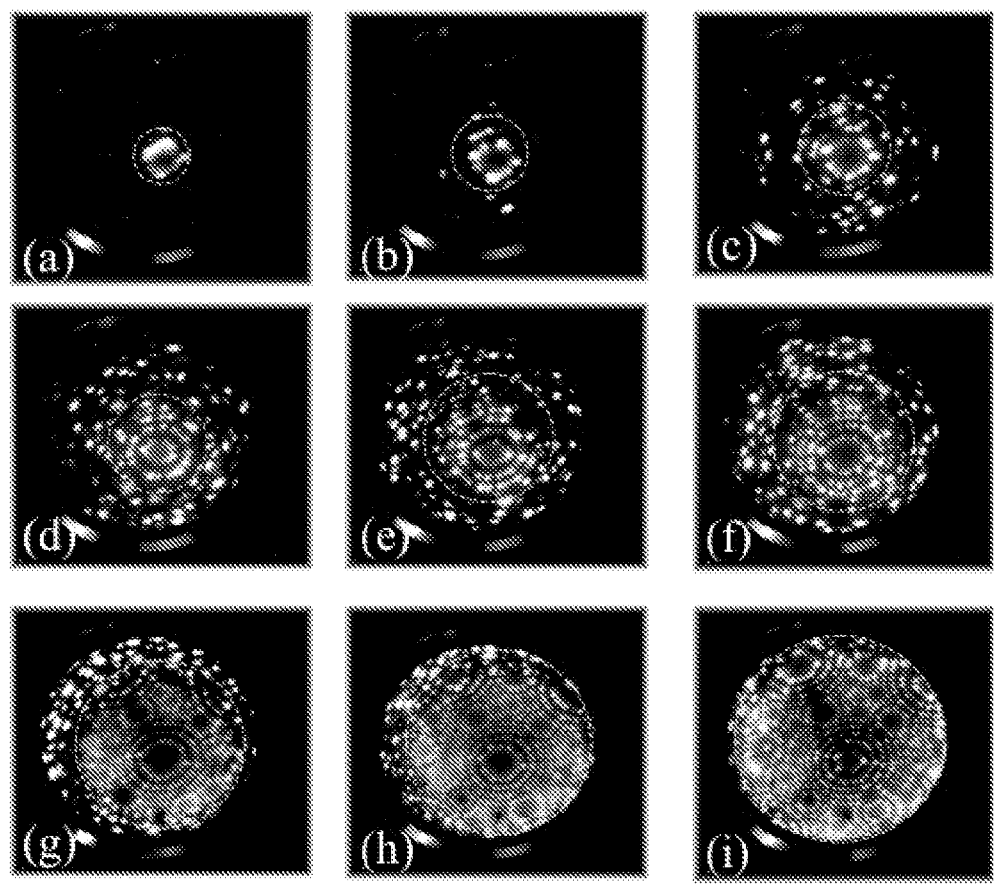
FIGS. 4a to 4i shows frames captured from the same movie during the subsequent field evaporation of the above single atom tip in the absence of reactant nitrogen gas.

During the increase of the applied field on the tip some adsorbates migrate from the shank toward the apex, this is clear from the bright spots around the apex in FIGS. 4(c-i). These adsorbates might be oxide or remaining nitrogen.

Figure 5:
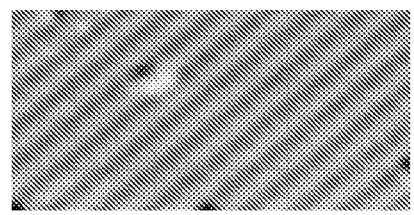
FIG. 5 is an STM image of Si(100) using a nitrogen-etched nano-tip, at −2 V and 56 pA.

Initial tests of these nano-tips in a UHV STM, that is attached to the FIM, have shown immediate atomic resolution of Si(100) as shown in FIG. 5.

It will be seen that in accordance with the principles of the invention the nitrogen reaction with tungsten surface atoms can be controlled by gradually reducing the tip voltage while monitoring this reaction. The key to this process is spatially selective desorption and reaction: Field assisted chemical etching at the apex can be avoided because, in that region of maximum field strength, nitrogen ionization occurs before adsorption/incorporation can result. The somewhat diminished field at the periphery of the apex allows nitrogen atom incorporation and drives removal of the atomic protrusions that result from the reaction. Confining this reaction to the shank of the tip has led to an extremely sharp tip with a well defined single-atom apex. The sharpness of the tip is evident from, (1) the decrease of the apex area, (2) the increase of spots size and spacing between spots on the FIM image, (3) the reduced imaging voltage required for successive images, and (4) the subsequent field evaporation of the top atomic layers of the obtained single atom tip.

Some of the advantages of this technique are that similar tips can be readily reproduced, the tips are prepared in situ and the entire process is monitored, and this method avoids the complexities of other techniques that arise from the heat treatment or the diffusion of other atoms on the surface in order to grow nano-tips. The tips produced so far have been made from inexpensive polycrystalline tungsten wire. As a result the tips prepared are very similar on the nanometer scale but differ somewhat in particular atomic structural details. The method could readily be applied to single crystal tungsten to yield yet greater control.

This nano-tip has been tested in a STM and showed immediate atomic resolution of Si(100).

Thus, it will be seen that in accordance with the principles of the invention the nano-tip formation is based on the spatially controlled reaction of nitrogen gas with tungsten tip atoms. These nanotips are readily, almost automatically formed. Single atom tips can be formed but, perhaps most importantly, the radius of curvature of the near apex region is very small, on the order of 1 nm. These ultra sharp tips can be made in the same ultra high vacuum system where they will be used, ensuring rigorous cleanliness. The nanotips made in accordance with embodiments of the invention are also robust enough to survive exposure to air during transportation.

Although the described embodiment employs a tungsten tip, the invention is not limited to tungsten. Other metals, metal alloys, ferromagnetic materials, antiferromagnetic materials or semiconductors could be employed instead.

We claim:

1. A method of fabricating nano-tips comprising:
   placing a precursor nano-tip with an apex and shank in a vacuum chamber;
   admitting an etchant gas to said vacuum chamber to perform field assisted etching by preferential adsorption of said etchant gas on said shank in the presence of an applied electric field; and
   gradually reducing the applied electric field to confine the adsorption of said etchant gas to said shank as etching progresses.

2. A method as claimed in claim 1, wherein the applied electric field is reduced below a threshold value prior to admitting said etchant gas.

3. A method as claimed in claim 2, wherein said threshold value is set at a level such that in the absence of said etchant gas, no evaporation of atoms from said tip takes place.

4. A method as claimed in claim 3, wherein said etching takes place in a field ion microscope, and said threshold value is sufficient to obtain a discernible image.

5. A method as claimed in claim 1, wherein after forming said nanotip, said etchant gas is removed and the electric field is further reduced to prevent removal of the last remaining atom.

6. A method as claimed in claim 1, further comprising applying an electric field to said precursor nanotip to remove oxide and other contaminant species prior to admitting the etchant gas.

7. A method as claimed in claim 1, wherein said precursor nanotip is made of tungsten and said etchant gas is nitrogen.

8. A method as claimed in claim 1, wherein said etchant gas is selected from the group consisting of: oxygen, ammonia, H atoms, C atoms, N atoms, and O atoms.

9. A method as claimed in claim 1, wherein the etchant gas is selected from the group consisting of: excited state species, and molecular fragments.

10. A method as claimed in claim 1, wherein said precursor tip is prepared by placing a wire in a vacuum chamber.

11. A method as claimed in claim 10, wherein said wire is an electrochemically etched polycrystalline wire.

12. A method as claimed in claim 10, wherein said wire is a single crystal wire.

13. A method as claimed in claim 10, wherein said vacuum chamber is an ultra high vacuum chamber.

14. A method as claimed in claim 10, wherein a positive voltage is gradually applied to the tip of said wire to remove an oxide layer and other contaminants.

15. A method as claimed in claim 10, wherein after removal of the oxide layer the electric field is increased to ensure successive field evaporation of a few layers from the apex in order to prepare a substantially clean, defect-free and a broad-surface tip.

16. A method of fabricating nano-tips comprising:
    placing a precursor nanotip with an apex and shank in a vacuum chamber of a field ion microscope;
    applying an electric field to said precursor nano-tip above to remove oxide and other contaminant species;
    reducing the applied field to a level sufficient to obtain an image but below which evaporation of atoms from said precursor nanotip occurs; and
    subsequently admitting an etchant gas to said vacuum chamber to perform preferential field assisted etching on said shank.

17. A method as claimed in claim 16, further comprising gradually reducing the applied electric field as said etching progresses to confine etching to said shank.

18. A method as claimed in claim 16, wherein said etchant gas is nitrogen.

19. A method as claimed in claim 16, wherein said etchant gas is selected from the group consisting of: nitrogen, ammonia, H atoms, C atoms, N atoms, and O atoms.

20. A method as claimed in claim 16, wherein the etchant gas is selected from the group consisting of: excited state species, and molecular fragments.

21. A method of fabricating nano-tips comprising:
    placing a precursor nanotip with an apex and shank in a vacuum chamber of a field ion microscope;
    applying an electric field to a level sufficient to obtain an image but below which evaporation of atoms from said precursor nanotip occurs; and
    subsequently admitting an etchant gas to said vacuum chamber to perform preferential field assisted etching on said shank.

22. A method as claimed in claim 21, further comprising gradually reducing the applied electric field as said etching progresses to confine etching to said shank.

23. A method as claimed in claim 21, wherein said etchant gas is nitrogen.

24. A method as claimed in claim 21, wherein said etchant gas is selected from the group consisting of: nitrogen, ammonia, H atoms, C atoms, N atoms, and O atoms.

* * * * *